(12) United States Patent
Matikainen et al.

(10) Patent No.: US 11,536,929 B2
(45) Date of Patent: Dec. 27, 2022

(54) DRIVER ASSEMBLY, CAMERA MODULE AND ELECTRONIC DEVICE HAVING IMAGE-CAPTURING FUNCTION

(71) Applicant: AAC Optics Solutions Pte. Ltd., Singapore (SG)

(72) Inventors: Jarno Matikainen, Tampere (FI); Tomi Lintulahti, Tampere (FI)

(73) Assignee: AAC Optics Solutions Pte. Ltd., Singapore (SG)

( * ) Notice: Subject to any disclaimer, the term of this patent is extended or adjusted under 35 U.S.C. 154(b) by 305 days.

(21) Appl. No.: 17/005,360

(22) Filed: Aug. 28, 2020

(65) Prior Publication Data

US 2022/0011536 A1 Jan. 13, 2022

(30) Foreign Application Priority Data

Jul. 9, 2020 (CN) .......................... 202010659823.0

(51) Int. Cl.

| | |
|---|---|
| *G03B 13/34* | (2021.01) |
| *G02B 7/08* | (2021.01) |
| *G02B 7/04* | (2021.01) |
| *G02B 7/02* | (2021.01) |
| *G03B 5/00* | (2021.01) |

(52) U.S. Cl.
CPC .............. *G02B 7/04* (2013.01); *G02B 7/021* (2013.01); *G02B 7/08* (2013.01); *G03B 5/00* (2013.01); *G03B 13/34* (2013.01); *G03B 2205/0046* (2013.01)

(58) Field of Classification Search
CPC ................................ F03G 7/0614; G02B 7/04
See application file for complete search history.

(56) References Cited

U.S. PATENT DOCUMENTS

| | | | |
|---|---|---|---|
| 6,434,932 B2 * | 8/2002 | Hara ....................... F03G 7/065 60/527 |
| 8,743,267 B2 * | 6/2014 | Ishikawa .......... H04N 5/232123 348/207.99 |
| 9,518,566 B2 * | 12/2016 | Eddington ......... H04N 5/23287 |
| 10,330,886 B2 * | 6/2019 | Shim ........................ G02B 7/08 |

FOREIGN PATENT DOCUMENTS

| | | | | |
|---|---|---|---|---|
| DE | 102004059844 A1 * | 7/2006 | ............. F16H 25/20 |
| JP | 2018120072 A * | 8/2018 | ............... G02B 7/04 |

\* cited by examiner

*Primary Examiner* — Leon W Rhodes, Jr.
(74) *Attorney, Agent, or Firm* — W&G Law Group

(57) ABSTRACT

Provided is a driver assembly for driving a moving component. The driver assembly includes: a motor; a transmission portion; and an execution portion; and a shape memory alloy wire connecting the moving component with the execution portion. The moving component is slidably connected to the transmission portion and spaced apart from the execution portion. The motor can drive the transmission portion to lead the execution portion to move along a first direction, in such a manner that the moving component is driven by the shape memory alloy wire to move along the first direction. The shape memory alloy wire is configured to drive the moving component to move along the first direction relative to the execution portion under an external electrical signal. When being applied in the camera module, the driver assembly can drive the movable lens assembly to move along an optical axis, facilitating the zooming and autofocus.

8 Claims, 4 Drawing Sheets

DRIVER ASSEMBLY, CAMERA MODULE AND ELECTRONIC DEVICE HAVING IMAGE-CAPTURING FUNCTION

TECHNICAL FIELD

The present invention relates to the technical field of electronic devices, and in particular to a driver assembly, a camera module and an electronic device having an image-capturing function.

BACKGROUND

The commonly used digital cameras, mobile phones having image-capturing functions, notebook computers, tablet computers and other handheld electronic devices generally include a camera module for image capturing. The camera module typically includes a driver assembly. During a process of image capturing, the driver assembly is configured to drive a camera lens to extend and telescope, so as to achieve zooming. In order to improve the image-capturing effect, it is necessary to improve the focusing performance of the camera module.

SUMMARY

The present invention provides a driver assembly, a camera module and an electronic device having an image-capturing function, which can achieve zooming and quick focusing.

In a first aspect, an embodiment of the present invention provides a driver assembly for driving a moving component. The driver assembly includes: a motor configured to provide a driving force; a transmission portion connected to an output terminal of the motor an execution portion movably cooperating with the transmission portion; and at least one shape memory alloy wire connecting the moving component with the execution portion. The moving component is capable of being slidably connected to the transmission portion and is spaced apart from the execution portion. The motor is capable of driving the transmission portion to lead the execution portion to move along a first direction, in such a manner that the moving component is driven by the at least one shape memory alloy wire to move along the first direction. Each of the at least one shape memory alloy wire is configured to drive the moving component to move along the first direction relative to the execution portion under an external electrical signal.

In the embodiment, when the motor is in operation, the output terminal of the motor drives the execution portion to move along the first direction through the transmission portion, thereby driving the moving component connected to the execution to move along the first direction. At the same time, when the shape memory alloy wire is connected to the moving assembly, since the shape memory alloy wire shrinks while being energized and stretches while being deenergized, the moving component is driven to move along the first direction. In addition, with the above configuration, it can be automatically achieved that the moving component moves along the first direction (through energizing or deenergizing the connecting member). Since the shape memory alloy wire can quickly shrink or stretch with temperature changes, the moving component can be driven by the connecting member (including the shape memory alloy) to move quickly. In conclusion, the movement of the moving component along the first direction can not only be realized through driving the motor, the transmission portion and the execution portion, but also be realized through driving the shape memory alloy wire, thereby optimizing the movement of the moving component.

In an embodiment, the at least one shape memory alloy wire includes two or more shape memory alloy wires.

In an embodiment, a direction along which each of the shape memory alloy wire shrinks and stretches is parallel with the first direction.

In an embodiment, the driver assembly further includes: a detection member configured to detect whether the moving component needs to be moved; and a control member configured to control, based on a detection result of the detection member, the external electrical signal to energize or deenergize the at least one shape memory alloy wire and to control a magnitude of a current flowing through the at least one shape memory alloy wire.

In an embodiment, in the first direction, an elastic member is provided between the moving component and the execution portion.

In an embodiment, each of the at least one shape memory alloy wire includes a first fixed end, a second fixed end, and an intermediate section located between the first fixed end and the second fixed end. The first fixed end is fixed to the moving component, the second fixed end is fixed to the execution portion, and a direction along which the intermediate section shrinks and stretches is parallel with the first direction.

In an embodiment, the moving component includes a first mounting base, and the execution portion includes a second mounting base. The first mounting base is configured to hold the first fixed end, and the second mounting base is configured to hold the second fixed end.

In a second aspect, an embodiment of the present invention provides a camera module. The camera module includes a lens group and the above driver assembly. The lens group includes a lens barrel and a camera lens received in the lens barrel, and the camera lens includes a fixed lens assembly fixed to the lens barrel and a movable lens assembly slidably connected to the lens barrel, and the movable lens assembly is the moving component. The driver assembly is configured to drive the movable lens assembly to move along an optical axis.

When the driver assembly is applied in the camera module, both the shape memory alloy wire and the execution portion of the driver assembly can be connected to the movable lens assembly, and when the motor drives the execution portion to move along the first direction through the transmission portion, the movable lens assembly can be driven to move along the optical axis, thereby realizing zooming of the movable lens assembly. During a process in which the shape memory alloy wire shrinks while being energized and stretches while being deenergized, the movable lens assembly is driven to move along the optical axis by the shape memory alloy wire, thereby achieving autofocusing. In addition, since the shape memory alloy wire can quickly deform with temperature changes, the moving component can move quickly, thereby achieving quick autofocusing. Thus, when the driver assembly is applied in the camera module, the camera module can achieve zooming and quick autofocusing.

In an embodiment, the movable lens assembly includes a hollow holding portion and a lens received in the holding portion, the holding portion is at least partially located in the lens barrel and includes an extending portion, an opening is provided on a side wall of the lens barrel and extends along the first direction, the extending portion extends out of the lens barrel through the opening and is movable along the opening, and the at least one shape memory alloy wire is connected to the extending portion.

In a third aspect, an embodiment of the present invention provides an electronic device having an image-capturing function. The electronic device includes a housing and the above camera module, and the camera module is mounted in the housing.

In an embodiment, the movable lens assembly includes a hollow holding portion and a lens received in the holding portion, the holding portion is at least partially located in the lens barrel and includes an extending portion, an opening is provided on a side wall of the lens barrel and extends along the first direction, the extending portion extends out of the lens barrel through the opening and is movable along the opening, and the at least one shape memory alloy wire is connected to the extending portion In the embodiments of the present invention, when the connecting member configured to be connected to the moving component includes a shape memory alloy, the shape memory alloy shrinks while being energized and stretches while being deenergized, thereby driving the moving component to move along the first direction. In addition, with the above configuration, it can be automatically achieved that the moving component moves along the first direction (through energizing or deenergizing the connecting member). Since the shape memory alloy can quickly shrink or stretch with temperature changes, the moving component can be driven by the connecting member (including the shape memory alloy) to move quickly.

When the driver assembly is applied in the camera module, the driver assembly can drive the movable lens assembly to move along an optical axis, thereby facilitating the autofocus and quick focusing.

It should be understood that the above general description and the following detailed description are only exemplary and do not limit the present invention.

REFERENCE SIGNS

Figure 1:
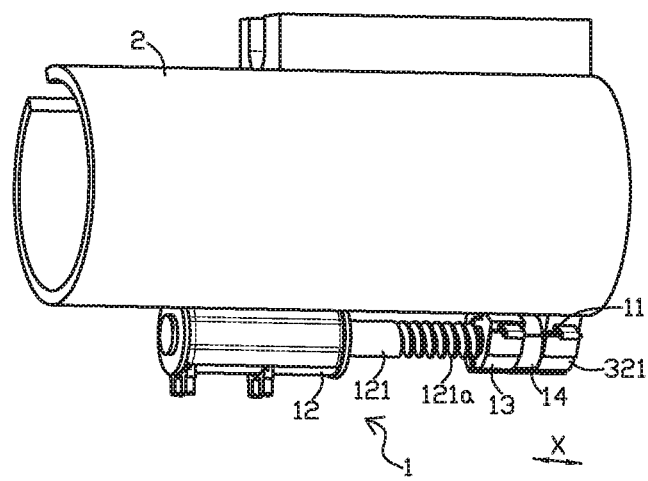
FIG. 1 is a structural schematic diagram of a camera module according to embodiments of the present invention.

1—driver assembly;
  11—shape memory alloy wire;
    111—first fixed end;
    112—second fixed end;
    113—intermediate section;
  12—motor;
    121—transmission portion;
      121a—external threads;
  13—execution portion;
    131—second mounting base;
  14—elastic member;
  15—base;
2—lens barrel;
  21—opening;
3—moving component;
  31—movable lens assembly;
  32—holding portion;
    321—extending portion;
      321a—first mounting base;
4—fixed lens assembly.

The drawings herein are incorporated into and constitute a part of the present specification, for illustrating embodiments of the present invention and explaining principles of the present invention together with the specification.

DESCRIPTION OF EMBODIMENTS

In order to better understand technical solutions of the present invention, the embodiments of the present invention will be described in details with reference to the drawings.

It should be clear that the described embodiments are merely parts of, rather than, all of the embodiments of the present invention. Based on the embodiments described in the present invention, any other embodiments obtained by those skilled in the art without paying creative efforts shall fall within the protection scope of the present invention.

The terms used in the embodiments of the present invention are merely for the purpose of describing particular embodiments, but not intended to limit the present invention. Unless otherwise noted in the context, the expressions in singular form such as "a", "an", "the" and "said" used in the embodiments and appended claims of the present invention are also intended to include plural form.

It should be understood that the term "and/or" used herein is merely a term describing relations of the associated objects, indicating three possible relationships. For example, "A and/or B" indicates three cases, i.e., only A existing, both A and B existing, and only B existing. In addition, the character "/" used herein generally indicates that the associated objects have an "or" relationship therebetween.

It should be noted that, the expressions such as "upper", "lower", "left", "right" and the like mentioned in embodiments of the present invention are described with reference to the placement status in the accompanying drawings, and should not be construed as limitations to the embodiments of the present invention. In addition, it should also be understood that, in the context, when an element is described as being formed "above" or "below" another element, the element may be directly formed "above" or "below" the other element, or the element may be formed "above" or "below" the other element via an intermediate element.

The camera module in the related art usually includes a lens group and a driver assembly, the lens group includes a lens barrel and a camera lens located in the lens barrel, and the camera lens is driven to move along its optical axis to achieving focusing when capturing images. The camera module can be provided with the driver assembly including a motor. When operating, the motor can drive the camera lens to move along the optical axis to achieve focusing. However, in the above solution, the motor has a certain lag during operation, so that the camera lens could not move quickly and achieve quick focusing, thereby affecting the normal operation and the image-capturing effect of the camera module.

Figure 2:
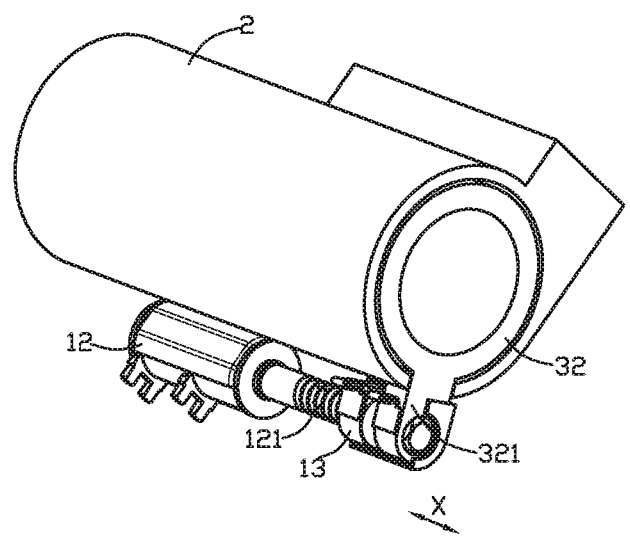
FIG. 2 is a structural schematic diagram of a camera module in another view.
Figure 3:
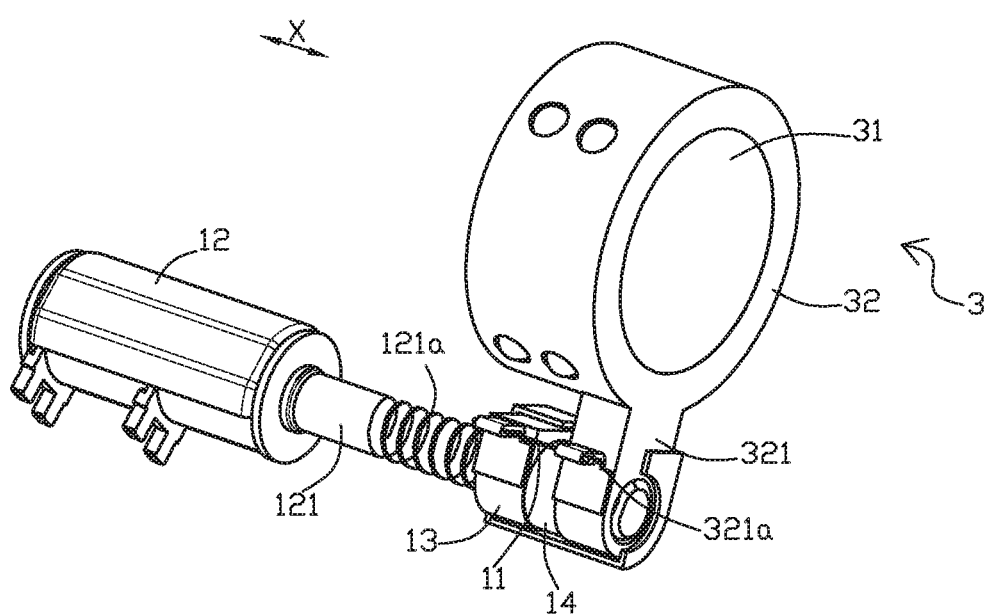
FIG. 3 is a schematic diagram illustrating a cooperation between a driver assembly and a lens.

In order to solve the technical problem described above, embodiments of the present invention provide a driver assembly as shown in FIG. 3, and the driver assembly 1 can be applied in a camera module shown in FIG. 1 and FIG. 2.

The camera module can be any electronic device having an image-capturing function and is connected to a housing of the electronic device. The electronic device having the image-capturing function can be a camera, a cellphone, a tablet personal computer, a desktop computer, a laptop computer, a handheld computer, a notebook computer, ultra-mobile personal computers (UMPC), netbooks, a cellular phone, a personal digital assistant (PDA), and an augmented reality (AR) device, a virtual reality (VR) device, an artificial intelligence (AI) device, a wearable device, a vehicle-mounted device, a smart home device, and/or a smart city device. The specific type of the electronic device is not particularly limited, as long as it includes a camera module.

As shown in FIG. 3, the driver assembly 1 is configured to drive the moving component 3 to move along a first direction X. The driver assembly 1 can include a connecting member. The connecting member is configured to be connected to the moving component 3, and includes at least a shape memory alloy wire 11. The shape memory alloy wire 11 is made of a shape memory alloy (SMA). The shape memory alloy undergoes a solid phase transition when being heated, which causes the material to shrink. The SMA material enters a martensite phase at a low temperature and enters an austenite phase at a high temperature, and the austenite phase induces deformation to cause shrinking of the SMA material.

In the embodiment, when the connecting member is being heated, i.e., at a high temperature, the SMA material shrinks, thereby driving the moving component 3 connected to the connecting member to move along the first direction X. When the connecting member is being cooled, i.e., at a low temperature, the SMA material stretches, thereby driving the moving component 3 connected to the connecting member to move along a direction opposite to the first direction X.

When the connecting member is being energized, the SMA material is heated up due to Joule heat generated by the energization and then shrinks; and when the connecting member is being deenergized, the temperature of the SMA material decreases, thereby expanding and stretching, and a length of the connecting member can be recovered to a length before the energization and shrinking, thereby allowing the moving component 3 to move along the first direction X.

In the embodiment, when the shape memory alloy wire 11 is connected to the moving component 3, the movement of the moving component 3 along the first direction X can be automatically achieved (by energizing and deenergizing the connecting member). Moreover, since the SMA material can quickly shrink or stretch with the temperature changes, the moving component 3 can move quickly when being driven by the shape memory alloy wire 11.

As shown in FIG. 1 and FIG. 2, a camera module can include a lens group. The lens group includes a lens barrel 2 and a camera lens. The camera lens is mounted in an inner cavity of the lens barrel 2. The camera lens includes a fixed lens assembly 4 fixed to the lens barrel 2, and a movable lens assembly 31 slidably connected to the lens barrel 2. When the driver assembly 1 is applied in the camera module, the driver assembly 1 is configured to drive a movable lens assembly 31 to move along an optical axis (the optical axis is parallel with the first direction X), and the optical axis is an optical axis of a lens 31 located in the movable lens assembly 31. The optical axis of the movable lens assembly 31 refers to a line passing through a center of the movable lens assembly 31. The movable lens assembly 31 can be the moving component 3.

Therefore, when the driver assembly 1 is configured to drive the movable lens assembly 31 to move along the optical axis. An end of the shape memory alloy wire 11 of the driver assembly 1 is connected to the movable lens assembly 31, and another end of the shape memory alloy wire 11 of the driver assembly 1 is connected to the execution portion 13. The shape memory alloy wire 11 can drive the movable lens assembly 31 to move along the optical axis while the shape memory alloy wire 11 (being made of a material including the SMA material) shrinks while being energized and stretches while being deenergized, thereby achieving autofocus. In addition, since the SMA material of the shape memory alloy wire 11 can be rapidly deformed when the temperature changes, the movable lens assembly 31 can be moved quickly to achieve quick focusing.

It should be noted that the driver assembly 1 in the embodiments of the present invention is configured to not only drive the movable lens assembly of the camera module to move, but also drive other components that need to be moved.

In an embodiment, the shape memory alloy wire 11 is made of a material including any suitable SMA material, such as nitinol or a SMA material including titanium alloy.

In an embodiment, the connecting member includes one or more shape memory alloy wires 11 (i.e., SMA wires), and each SMA wire 11 is connected to the moving component 3.

In the embodiment, the connecting member is made of a SMA material, thereby simplifying a structure of the connecting member and facilitating processing.

A diameter of the shape memory alloy wire 11 is not limited, and can be adjusted according to actual performance requirements. The shape memory alloy wire 11 may have a same diameter or different diameters, and the diameter of each shape memory alloy wire 11 can be the same or different. For example, the diameter of the shape memory alloy wire 11 ranges from 10 μm to 50 μm.

Figure 4:
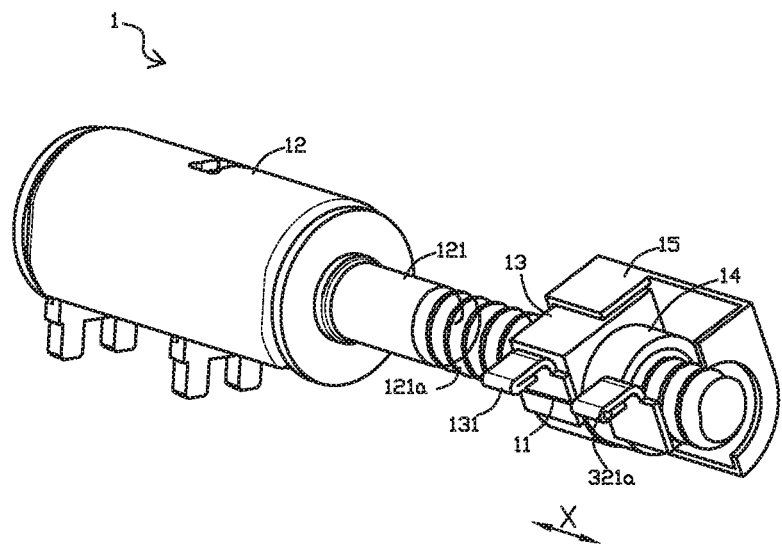
FIG. 4 is a structural schematic diagram of a driver assembly shown in FIG. 1.
Figure 5:
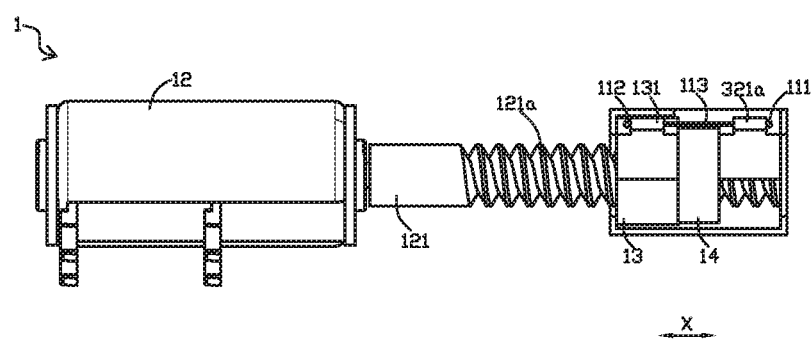
FIG. 5 is a front view of a driver assembly shown in FIG. 4.

In an embodiment, as shown in FIG. 3 to FIG. 5, a direction along which the shape memory alloy wire 11 shrinks and stretches is parallel with the first direction X along which the moving component moves.

In the embodiment, when the connecting member is stretching or shrinking, the moving component 3 can be driven to move along the first direction X. When a direction along which the shape memory alloy wire 11 stretches or shrinks is parallel with the first direction X, the accuracy and stability of the movement of the moving component 3 along the first direction X can be improved, and the risk in which the moving component 3 deviates from the first direction X can be reduced. When the driver assembly 1 is applied in the camera module, the accuracy and stability of the movement of the movable lens assembly 31 along the optical axis can be improved, and the risk of the movable lens assembly 31 of deviating from the optical axis can be reduced.

In an embodiment, the connecting member includes two or more shape memory alloy wires 11, the two or more shape memory alloy wires 11 are parallel with each other and are each connected to the moving component 3, and positions where the two or more shape memory alloy wires 11 are connected to the moving component 3 are spaced apart from each other, which reduces the risk of rotation of the moving component 3 during a moving process of the moving component 3, thereby improving the accuracy and stability of the movement of the moving component 3 along the first direction X.

In an embodiment, as shown in FIG. 3, one end of the connecting member is configured to be connected to the moving component 3, and the other end of the connecting member is connected to the execution portion 13. Therefore, when the shape memory alloy wire 11 is being energized or deenergized, it can shrink or stretch between the moving component 3 and the execution portion 13, and during the shrinking or stretching, the moving component 3 can be driven to move along the first direction X.

In the embodiment, the moving component 3 can be driven to move along the first direction X in the following two manners. In a first manner, an output terminal of a motor 12 drives, through the transmission portion 121, the execution portion 13 to move along the first direction X, thereby driving the moving component 3 connected to the execution portion 13 to move along the first direction X. In a second manner, the shape memory alloy wire 11 is energized (or deenergized) in such a manner that the shape memory alloy wire 11 shrinks (or stretches), thereby driving the moving component 3 to move along the first direction X. The above two driving manners can be relatively independent from each other, that is, the moving component 3 can be driven only in the first manner or only in the second manner, and of course, it can also be driven by the both manners. In the actual use, the user can make a choice between the above two driving manners according to the actual requirements, thereby improving the performance of the driver assembly 1 in driving the moving component 3.

When the driver assembly 1 is applied in the camera module, that is, the moving component 3 is used as the movable lens assembly 31 of the camera module, it can be achieved through the first driving manner that the movable lens assembly 31 can be driven through the execution portion 13 to move along the first direction X. It can be also achieved through the second driving manner that the movable lens assembly 31 can be driven through the shape memory alloy wire 11 to move along the first direction X, thereby achieving autofocusing of the camera module and improving the autofocusing performance of the camera module.

In an embodiment, in the first direction X, an elastic member 14 is arranged between the moving component 3 and the execution portion 13, and the elastic member 14 can be elastically deformed while the shape memory alloy wire 11 is stretching or shrinking. For example, the elastic member 14 may be made of a spring, an elastic pad, or an elastic sheet.

In the embodiment, when the shape memory alloy wire 11 is shrinking while being energized, the shape memory alloy wire 11 exerts a pulling force on the moving component 3 and the execution portion 13, so as to drive the moving component 3 and the execution portion 13 to approach each other, thereby compressing the elastic member 14 between the moving component 3 and the execution portion 13. When the shape memory alloy wire 11 is stretching while being deenergized, the shape memory alloy wire 11 is in a relaxed state between the moving component 3 and the execution portion 13, and the pulling force exerted on the moving component 3 and the execution portion 13 disappears. At this time, the moving component 3 and the execution portion 13 move away from each other under a resilience force of the elastic member 14, thereby driving the moving component 3 to move along the first direction X.

Therefore, when the driver assembly 1 is applied in a camera module, a reciprocating movement of the movable lens assembly 31 along the optical axis can be achieved through a cooperation of the shape memory alloy wire 11 and the elastic member 14, and a displacement of the movable lens assembly 31 in this process is related to an amount of elastic deformation of the elastic member 14 and amounts of stretching and shrinking of the shape memory alloy wire 11. When the amount of elastic deformation of the elastic member 14 is small and the amount of shrinking of the shape memory alloy wire 11 is small, the displacement of the movable lens assembly 31 generated in this process is small. Accordingly, when both the amount of elastic deformation of the elastic member 14 and the amount of shrinking of the shape memory alloy wire 11 are large, the displacement of the movable lens assembly 31 generated in the process is large.

In an embodiment, as shown in FIG. 5, the shape memory alloy wire 11 includes a first fixed end 111, a second fixed end 112, and an intermediate section 113 located between the first fixed end 111 and the second fixed end 112. The first fixed end 111 is fixed to the moving component 3, the second fixed end 112 is fixed to the execution portion 13, the intermediate section 113 is stretchable and shrinkable, and a direction along which the intermediate section 113 stretches and shrinks is parallel with the first direction X of the moving component 3.

Therefore, the ends of the shape memory alloy wire 11, which are respectively connected to the moving component 3 and the execution portion 13, are fixed and may not shrink or stretch when the temperature increases or decreases, thereby improving the reliability of the connection between the shape memory alloy wire 11 and the moving component 3 and the connection between the shape memory alloy wire 11 and the execution portion 13.

In an embodiment, the driver assembly 1 further includes a detection member and a control member. The detection member is configured to detect information on a movement of the moving component 3, and the control member is configured to control the shape memory alloy wire 11 to be energized or deenergized based on a detection result of the detection member and to control a magnitude of a current flowing through the shape memory alloy wire 11.

In an embodiment, the control member may be a control circuit or a controller, such as a control circuit or a controller arranged in the camera module.

In the embodiments, through the information detected by the detection member, the control member can control the shape memory alloy wire 11 to shrink or stretch by turning on or turning off a circuit located between the shape memory alloy wire 11 and a power supply, thereby driving the moving component 3 to move along the first direction X. As an example, the control member may cut off the circuit located between the shape memory alloy wire 11 and the power supply, in such a manner that the shape memory alloy wire 11 is deenergized. At this time, the shape memory alloy wire 11 is in a stretched state, and under the resilience force of the elastic member 14, the moving component 3 is driven to move along the first direction X. As another example, the control member may turn on the circuit located between the shape memory alloy wire 11 and the power supply, in such a manner that the shape memory alloy wire 11 is energized. At this time, the shape memory alloy wire 11 is in a shrunk state and drives the moving component 3 to move along a direction opposite to the first direction X. The process in which the shape memory alloy wire 11 is heated can be directly achieved by a current of the power supply, and a process in which the shape memory alloy wire 11 is cooled can be achieved by reducing the current or cutting off the current.

In an embodiment, the detection member is configured to detect whether the moving component 3 needs to be moved. When the detection member detects that the moving component 3 needs to be moved, the detection member transmits a signal to the control member, which then controls the shape memory alloy wire 11 to be energized or deenergized, so that the shape memory alloy wire 11 shrinks or stretches to drive the moving component 3 to move. When the driver assembly 1 is applied in the camera module, the shape memory alloy wire 11 can be energized or deenergized through the detection member and the control member, thereby facilitating autofocusing and quick focusing.

In an embodiment, as shown in FIG. 3, the motor 12 includes an output shaft, and the transmission portion 121 is connected to the output shaft, such that the execution portion 13 is driven through the transmission portion 121 to move along the first direction X when the output shaft of the motor 12 is rotating. When the driver assembly 1 is operating, the output shaft 121 of the motor 12 drives the transmission portion 121 to rotate, and the transmission portion 13 is configured to convert a rotary motion of the transmission portion 121 to a linear motion parallel with the first direction X, so that the execution portion 13 drives the moving component 3 to move along the first direction X. Therefore, the execution portion 13 in the present embodiment can be a linear motion mechanism, for example, a screw-slider mechanism, a gear-rack mechanism, or the like.

In an embodiment, an axial direction of the transmission portion 121 is parallel with the first direction X of the moving component 3. The transmission portion 121 is provided with external threads 121a, and accordingly, the execution portion 13 is provided with internal threads, so that the transmission portion 121 and the execution portion 13 are connected to each other through threads. During the rotation of the transmission portion 121, the execution portion 13 can be driven to move linearly along the axial direction of the transmission portion 121, so that the rotary motion of the transmission portion 121 is converted to the linear motion by the execution portion 13.

In an embodiment, the motor 12 is a stepper motor. The stepper motor is a motor configured to convert an electrical pulse signal to a corresponding angular displacement or linear displacement. Therefore, the amount of the angular displacement of the stepper motor can be adjusted by changing parameters of the stepper motor, thereby adjusting the linear movement distance of the execution portion 13 based on the user's requirements and thus adjusting a position of the moving component 3.

In an embodiment, when the driver assembly 1 is applied in the camera module, as shown in FIG. 3, the movable lens assembly 31 includes a hollow holding portion 32 and a lens received in the holding portion 32. The holding portion 32 is at least partially located in the lens barrel 2 and is movable in the lens barrel 2. In the present invention, a shape and a size of the inner cavity of the lens barrel 2 are not limited, and an overall shape and a structural form of the movable lens assembly 31 are not limited either. For example, the movable lens assembly 31 may include a single lens 31 or a lens group consisting of multiple lenses 31, and the single lens or the lens group can be first accommodated in a fixing member and then held by the holding portion 32 to form the movable lens assembly 31. The shape and the structural form of the holding portion 32 are not limited, and a manner for assembling the holding portion 32 and the lens 31 is not limited either.

Figure 6:
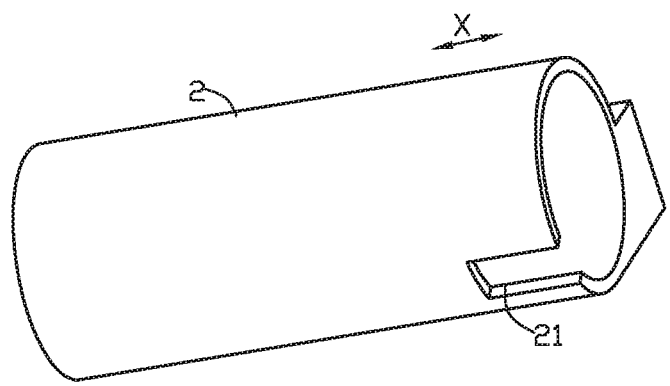
FIG. 6 is a structural schematic diagram of a lens barrel shown in FIG. 1.
Figure 7:
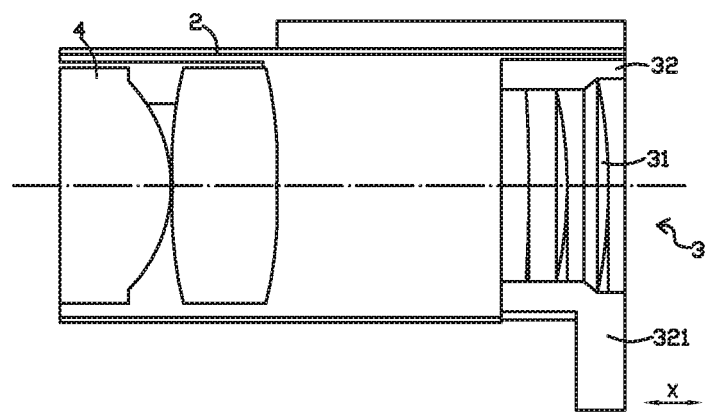
FIG. 7 is a perspective view of a lens assembly shown in FIG. 1.

In an embodiment, the holding portion 32 is provided with an extending portion 321, the extending portion 321 extends out of the lens barrel 2 from an end of the lens barrel 2 in an axial direction of the lens barrel. For example, as shown in FIG. 6, a side wall of the lens barrel 2 is provided with an opening 21, and the opening 21 extends along the first direction X and penetrates the end of the lens barrel 2. The extending portion 321 extends out of the lens barrel 2 through the opening 21. The opening 21 is provided in such a manner that the extending portion 321 can move along the first direction X. The shape memory alloy wire 11 is connected to the extending portion 321 to be connected to the movable lens assembly 31.

In an embodiment, as shown in FIG. 3, a part of the extending portion 321 of the movable lens assembly 31 outside the lens barrel 2 is provided with a first mounting base 321a, and accordingly, the execution portion 13 is provided with a second mounting base 131. A direction along which the first mounting base 321a and the second mounting base 131 are arranged is parallel with the optical axis. As shown in FIG. 5, the first fixed end 111 of the shape memory alloy wire 11 is held by the first mounting base 321 a, and the second fixed end 112 is held by the second mounting base 131.

In an embodiment, the connection between the first fixed end 111 and the first mounting base 321a, and the connection between the second fixed end 112 and the second mounting base 131 can also be achieved by means of bonding, welding or the like.

As shown in FIG. 4, the driver assembly 1 further includes a base 15, in which the transmission portion 121 and the moving component 3 are to be mounted. The base 15 is provided with a mounting cavity, the transmission portion 121 is at least partially mounted in the mounting cavity. A portion of the moving component 3 is mounted in the mounting cavity and the elastic member 14 is also mounted in the mounting cavity.

The above-described embodiments are merely preferred embodiments of the present invention, but not intended to limit the present invention. Various changes and modifications can be made to the present invention by those skilled in the art. Any modifications, equivalent substitutions and improvements within the principle of the present invention shall fall into the protection scope of the present invention.

What is claimed is:

1. A camera module, comprising:
   a lens group comprising:
      a lens barrel; and
      a camera lens received in the lens barrel, comprising:
         a fixed lens assembly fixed to the lens barrel; and
         a movable lens assembly slidably connected to the lens barrel; comprising:
            a hollow holding portion at least partially located in the lens barrel; and
            a lens received in the holding portion;
   a driving assembly configured to drive the movable lens assembly to move along an optical axis direction, comprising:
      a motor configured to provide a driving force;
      a transmission portion connected to an output terminal of the motor;
      an execution portion movably cooperating with the transmission portion; and
      at least one shape memory alloy wire connecting the movable lens assembly with the execution portion,
   wherein the movable lens assembly is capable of being slidably connected to the transmission portion and is spaced apart from the execution portion;
   the motor is capable of driving the transmission portion to lead the execution portion to move along the optical axis direction, in such a manner that the movable lens assembly is driven by the at least one shape memory alloy wire to move along the optical axis direction; and each of the at least one shape memory alloy wire is configured to drive the movable lens assembly to move along the optical axis direction relative to the execution portion under an external electrical signal;

the holding portion of the movable lens assembly is at least partially located in the lens barrel and comprises an extending portion, an opening is provided on a side wall of the lens barrel and extends along the optical axis direction, the extending portion extends out of the lens barrel through the opening and is movable along the opening, and the at least one shape memory alloy wire is connected to the extending portion.

2. The camera module as described in claim 1, wherein a direction along which each of the shape memory alloy wire shrinks and stretches is parallel with the optical axis direction.

3. The camera module as described in claim 1, further comprising:
   a detection member configured to detect whether the movable lens assembly needs to be moved; and
   a control member configured to control, based on a detection result of the detection member, the external electrical signal to energize or deenergize the at least one shape memory alloy wire and to control a magnitude of a current flowing through the at least one shape memory alloy wire.

4. The camera module as described in claim 1, wherein along the optical axis direction, an elastic member is provided between the movable lens assembly and the execution portion.

5. The camera module as described in claim 1, wherein each of the at least one shape memory alloy wire comprises a first fixed end, a second fixed end, and an intermediate section located between the first fixed end and the second fixed end, and
   wherein the first fixed end is fixed to the movable lens assembly, the second fixed end is fixed to the execution portion, and a direction along which the intermediate section shrinks and stretches is parallel with the optical axis direction.

6. The camera module as described in claim 5, wherein the movable lens assembly comprises a first mounting base, and the execution portion comprises a second mounting base, and
   wherein the first mounting base is configured to hold the first fixed end, and the second mounting base is configured to hold the second fixed end.

7. The camera module as described in claim 1, wherein the at least one shape memory alloy wire comprises two or more shape memory alloy wires.

8. An electronic device having an image-capturing function, comprising:
   a housing; and
   the camera module as described in claim 1, wherein the camera module is mounted in the housing.

* * * * *